United States Patent

Harsanyi et al.

[15] 3,673,188
[45] June 27, 1972

[54] HETEROCYCLIC AMIDOXIMES

[72] Inventors: Kalman Harsanyi; Kalman Takacs; Zsuzsa Relle nee Somfai; Eva Milak nee Krompecher; Laszlo Tardos; Dezso Korbonits; Pal Kiss; Csaba Gonczy, all of Budapest, Hungary

[73] Assignee: CHINOIN Gyogyszer-es Vegyeszeti Termekek Gyara RT, Budapest, Hungary

[22] Filed: May 29, 1968

[21] Appl. No.: 732,845

[30] Foreign Application Priority Data

June 6, 1967 Hungary ................................. CI-714

[52] U.S. Cl. ...................... 260/288 R, 260/250 R, 260/252, 260/256 YF, 260/283 CN, 260/304, 260/307 D, 260/308 R, 260/309.2, 260/310 A, 260/326.15, 260/465 D, 424/250, 424/251, 424/253, 424/258, 424/273, 424/274
[51] Int. Cl. ....................................................... C07d 35/14
[58] Field of Search ............................................. 260/288, 287

[56] References Cited

UNITED STATES PATENTS

| | | | |
|---|---|---|---|
| 3,539,576 | 11/1970 | Davis et al. | 260/288 R |
| 3,150,135 | 9/1964 | Forman | 260/288 X |
| 3,354,174 | 11/1967 | Bell | 260/309.2 |
| 3,420,847 | 1/1969 | Bell | 260/288 X |
| 3,472,872 | 10/1969 | Bell | 260/326.15 |
| 3,505,336 | 4/1970 | Bailey | 260/287 |

*Primary Examiner*—Donald G. Daus
*Attorney*—Karl F. Ross

[57] ABSTRACT

Novel compounds of the general formula

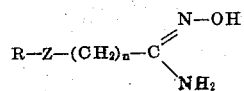

and salts thereof
wherein
R is a member of the group selected from indolyl, benzimidazolyl, benzoxazolyl, benztriazolyl, benzthiazolyl, indazolyl, benzisothiazolyl, pyrimidoimidazolyl, isoquinolinyl, isocarbostyrylyl, quinazolinyl, quinoxalinyl and benztriazinyl and substituted derivatives thereof; whereby the ring containing the heteroatom may be hydrogenated and whereby one or two carbon atoms of said ring may be bound exocyclically with two valence-bonds to an oxygen or sulphur atom of a carbonyl or thiocarbonyl group;
Z is a member of the group consisting of methylene and phenyl substituted methylene;
$n$ is a number selected from the group consisting of 0, 1 and 2
which possess valuable therapeutical properties as antiphlogistics.

1 Claim, No Drawings

HETEROCYCLIC AMIDOXIMES

There are only a few alkane- and aralkane-substituted heterocyclic carboxylic amidoximes described in the chemical literature. The known amidoximes are e.g. substituted by a monocyclic heterocyclic ring; a phthalimido, quinolyl ring; a heterocyclic radical consisting of three rings (Chem. Reviews 62, 155, 1962); a heterocyclic radical comprising one ring; or a phthalazinyl radical (Schurn. Obsch. Chim. 32, 1962 page 3,669) the latter compound group was reported to have a hypotensive effect (Rev. Chim. Acad. Rep. Pop. Roumaine 7,2,1962 page 1,405–15). Other therapeutic utilities of the known compounds were not described.

According to the present invention there are provided new compounds of the general formula

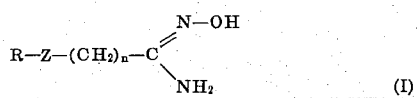

and salts thereof,
wherein
R stands for an unsubstituted or substituted indolyl, benzimidazolyl, benzoxazolyl, benztriazolyl, benzthiazolyl, indazolyl, benzisothiazolyl, pyrimido-imidazolyl, isoquinolinyl, isocarbostyrylyl, quinazolinyl, quinoxalinyl or benztriazinyl radical or derivatives thereof in which the ring containing the heteroatom is hydrogenated and in which, if desired, one or two carbon atoms of said ring may be bound exocyclically with two valance-bonds to an oxygen or sulphur atom of a carbonyl or thiocarbonyl group;
Z stands for a methylene group which may be optionally substituted with a phenyl radical;
$n$ is 0, 1 or 2.

Said compounds are valuable products which may be used in therapy, mainly due to their antiphlogistic, antipyretic and analgetic activity.

The heterocyclic radical R may be substituted with one or more groups which may be the same or different. Suitable substituents are for example the following groups: halogen (particularly chlorine or bromine); alkoxy (straight or branched chained alkoxy groups having preferably not more than four carbon atoms, such as methoxy or ethoxy); alkyl (straight or branched chained alkyl groups containing preferably not more than four carbon atoms, such as methyl or ethyl); hydroxy; mercapto; aralkoxy (e.g. benzyloxy) and aryl (e.g. a phenyl radical which may be optionally substituted).

As particularly suitable members for R there may be mentioned the following radicals:
3-indolyl, 2-benzimidazolyl, benztriazolyl, 1,3-dimethylxanthin-7-yl, 6,7-dimethoxy-3,4-dihydro-isoquinolin-1-yl, 6,7-diethoxy-3,4-dihydro-isoquinoline-yl, 3,4-dihydro-6,7-dimethoxy-isocarbostyryl-2-yl, 1 H-quinoxaline-2-on-1-yl-,2-methyl-3(3H)-quinazole-4-on-3-yl or a 3-hydroxy-quinoxaline-2-yl radical.

Z stands for a methylene group which may be substituted with a phenyl radical. $n$ is 0, 1 or 2; preferably it is 0, or 1.

Particularly valuable representatives of the compounds of the formula 1 are the following 3-indolyl-acetamidoxime
2-benzimidazolyl-acetamidoxime
3-(5-chloro-benzoxazolon-2-yl-3)-propionyl-amidoxime
3-(benztriazolyl-1)-propionyl-amidoxime
3-(theophylline-7-yl)-propionyl-amidoxime
(6,7-dimethoxy-3,4-dihydro-isoquinolinyl-1)-acetamidoxime
(6,7-diethoxy-3,4-dihydro-isoquinolinyl-1)-acetmidoxime
3-(6,7-dimethoxy-3,4-dihydro-isocarbostyryl-2-yl)-propionyl-amidoxime
3-(1/1H/-quinoxalinone-2-yl)-propionyl-amidoxime
3-(2-methyl-3H-quinazolone-4-yl/3/)-propionyl-amidoxime
and
3-hydroxy-2-quinoxalinyl-phenyl-acetamidoxime.

The salts of the compounds of the formula I may be formed with pharmaceutically suitable mineral or organic acids, such as hydrochloric acid, hydrobromic acid, sulphuric acid, phosphoric acid, nitric acid, acetic acid, lactic acid, tartaric acid, maleic acid etc.

According to a further feature of our invention there is provided a process for the preparation of the new compounds of the general formula I and salts thereof, which comprises reacting a compound of the general formula

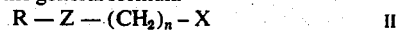

wherein R, Z and $n$ have the meanings stated above and X stands for a nitrile group, a thio-amido group of the formula —CSNH$_2$, an iminoether-group of the formula —C( = NH)OAlkyl or a hydroxamic acid chloride group of the formula —C( = NOH)Cl, with a compound of the general formula

wherein W stands for a hydroxy group or if X in the formula II represents a hydroxamic acid chloride group, W is hydrogen, and if desired converting the compounds thus obtained into their salts or setting free an amidoxime of the formula I from the salt thereof, or converting one salt into another.

According to a very preferred form of realization of our process compounds of the formula II, wherein X stands for a nitrile group, are reacted with hydroxylamine. The nitriles of the formula II used as starting materials are partly new compounds; thus e.g. the 3-(2-cyano-ethyl)-5-chloro-benzoxazole-2-one, 1-(2-cyano-ethyl)-benztrizole, 2-hydroxy-α-cyano-benzyl quinoxaline, 2-methyl-3(3H)-(2-cyano-ethyl)-quinazole-4-one and the 1-(1H)-(2-cyano-ethyl)-quinoxaline-2-one are new compounds which may be prepared by methods known per se.

The hydroxylamine may be used in the form of the free base or a salt thereof, it can be added however as hydroxylamine hydrochloride. The hydroxylamine may be used in equimolar amounts or preferably in an excess (about 1–3 moles, calculated on 1 mole of the compound of the formula II). If hydroxylamine-hydrochloride is used, it may be added advantageously in equimolar amount. The reaction may be carried out in aqueous or anhydrous medium. The following solvents may be used as reaction medium: aqueous or anhydrous aliphatic alcohols (such as methanol or ethanol), ethers (e.g. diethyl ether) or hydrocarbons (e.g. benzene or toluene). One may proceed particularly preferably by carrying out the reaction in aqueous ethanol. If hydroxylamine-hydrochloride is used, the base may be set free in the reaction mixture by adding alkali hydroxides (e.g. sodium hydroxide), alkali carbonates (e.g. sodium carbonate or potassium carbonate), alkali hydrogen carbonates (such as sodium hydrogen carbonate) or organic bases (e.g. triethylamine).

The reaction temperature is not critical by interaction. It is however preferably to carry out the reaction at elevated temperature, e.g. under reflux. One may also proceed by allowing to stand the reaction mixture at room temperature, whereby however a longer reaction time is required.

The reaction mixture may be worked up by methods known per se. The desired product often precipitates, whereby it may be isolated by filtration. In other cases the reaction mixture is evaporated and the desired product is recovered by extraction carried out with organic solvents.

According to an other embodiment of our process compounds of the formula II, wherein X stands for a thioamido-group, are reacted with hydroxylamine. The thioamides used as starting material may be prepared by adding hydrogen sulphide the corresponding nitrile of the formula II. The interaction of the thioamide of the formula II and hydroxylamine may be carried out by using the hydroxylamine component in the form of the free base. The reaction may be carried out in aqueous medium or in the presence of organic solvents, such as ethanol. The reaction temperature is not critical. One may proceed by carrying out the reaction at higher temperature or allowing the reaction mixture to stand at room temperature for a longer period.

According to a further feature of our process iminoethers of the formula II, wherein X stands for a group of the formula —

C( = NH)OAlkyl, are reacted with hydroxylamine. The iminoether starting materials may be readily obtained by reacting the corresponding nitrile of the formula II with the corresponding alcohol. The interaction between the iminoether of the formula II and hydroxylamine is carried out in anhydrous medium. The hydroxylamine component is used preferably in the form of the free base. According to a further feature of the present invention hydroxamic acid-chlorides of the formula II, wherein X is the group of the formula —C( = N—OH)Cl, are reacted with ammonia. The interaction may be carried out preferably at elevated temperature. Ammonia may be replaced by ammonium salts. According to a preferred embodiment of this method one may use ammonium-carbonate.

The compounds of the formula I may be transformed into their salts or the amidoximes may be set free from their salts or a salt may be converted into an other pharmaceutically suitable salt. Mineral acids, such as hydrochloric acid, hydrobromic acid, hydroiodic acid, sulphuric acid, nitric acid, phosphoric acid or organic acids, such as acetic acid, lactic acid, tartaric acid, maleic acid etc. may be used for this purpose. The salt formation may be carried out by methods known per se, for example by reacting a solution of the compound of the formula I formed with an organic solvent with an equivalent amount of the corresponding acid.

According to a further feature of the present invention there are provided pharmaceutical compositions comprising as active ingredient at least one compound of the formula I, wherein R, Z and n have the same meaning as stated above, in admixture with inert, solid or liquid carriers and/or excipients.

The pharmaceutical compositions may be finished in forms ready for oral, parenteral or rectal administration. They may be solid, such as tablets, pills, coated pills, capsules, suppositories, etc. or liquid preparations, such as solutions, suspensions, emulsions, injections, etc. The compositions may contain usual pharmaceutical carriers, e.g. water, gelatine, starch, magnesium stearate, talc, lactose, polyalkylene-glycols, etc. and optionally other pharmaceutical additives, such as desintegrating agents, stabilizers, emulsifiers, wetting agents, etc. The compositions may optionally contain further therapeutically active compounds in addition to the amidoximes of the formula I.

The above pharmaceutical compositions may be prepared by conventional methods of pharmaceutical industry.

Further details of our process are to be found in the Examples; it is however by no means intended to limit the scope of our invention to the examples.

EXAMPLE 1

50 g. of 3-indolyl-acetonitrile are dissolved in 300 ml. of ethanol, whereupon a solution of hydroxylamine base (set free from 44.5 g. of hydroxylamine-hydrochloride with 53.7 g. of sodium hydrogen carbonate in 150 ml. of water) is added. The reaction mixture is boiled on a hot water-bath for 17 hours, whereupon it is poured into 400 ml. of water. The precipitated crystalline crude product is filtered by suction and recrystallized from hot 50 percent by volume ethanol.
Thus 51.0 g. of 3-indolyl-acetamidoxime are obtained.
M.p.: 146°–148° C.
Analysis: N% = 22.20 (calc.: 22.21).
Molecular weight: 189.21; $C_{10}H_{11}N_3O$

EXAMPLE 2

193.6 g. of 2-cyanomethyl-benzimidazole are dissolved in 667 ml. of 96 percent ethanol, whereupon a solution of hydroxylamine base is added (the base was set free from 171.5 g. of hydroxylamine hydrochloride with 206.8 g. of sodium-hydrogen carbonate in 667 ml. water as medium). The reaction mixture is refluxed for 15 hours. After cooling the precipitated crystalline product is filtered and dried. Thus 203.0 g. of 2-benzimidazolyl-acetamidoxime are obtained.
M.p.: 206°–207° C. The product may be recrystallized from 96 percent ethanol.

Analysis: C% = 56.68 (calc.: 56.83); H% = 5.44 (5.30)
Molecular weight: 190.20; $C_9H_{10}N_4O$

EXAMPLE 3

51.0 g. of 5-chloro-benzoxazolone-2 and 150 ml. of acrylonitrile are boiled in the presence of 1.0 g. of phthalimide-potassium for 6 hours. After cooling the precipitated crystals are filtered. On recrystallizing the crude product from hot 96 percent ethanol 55.0 g. of 3-(2-cyanoethyl)-5-chloro-benzoxazolone-2 are obtained. M.p.: 182°–184° C.
Analysis: N% = 11.07 (calc.: 10.95)
Molecular weight: 222.62; $C_{10}H_7ClN_2O_2$ 22.27 g. of 3-(2-cyanoethyl)-5-chloro-benzoxazolone-2 are dissolved in 100 ml. of ethanol, whereupon an aqueous solution of hydroxylamine base (set free from 13.9 g. of hydroxylamine hydrochloride according to the method described in the previous examples) is added. The reaction mixture is refluxed for 17 hours, whereupon it is evaporated to dryness and 150 ml. of water are added to the residue. The crystalline crude product is filtered by suction and recrystallized from hot water. Thus 14.65 g. of 3-(5-chloro-benzoxazolone-2-yl-3)-propionyl-amidoxime are obtained.
M.p.: 151°–155° C. (decomposition).
Analysis: N percent = 16.02 (calc.: 16.43).
Molecular weight: 255.66; $C_{10}H_{10}ClN_3O_3$.

EXAMPLE 4

23.8 g. of benztriazole are dissolved in 100 ml. of dioxane, whereupon 1 ml. of Triton B-catalyst is added and 16.4 ml. of acrylic nitrile are added dropwise. The reaction mixture is heated at 65° C. for 2 hours, whereupon 0.1 ml. of a 40 percent sodium hydroxide solution is added and heating is carried out at 80° C. for further 4 hours. The solvent is evaporated in vacuo and the residue is recrystallized from a mixture of benzene and petrol. Thus 20.0 g. of 1-(2-cyanoethyl)-benztriazole are obtained. M.p.: 82°–84° C.

| Analysis: | Calc.:C | 62.77 | H 4.67 | N 32.54 % |
|---|---|---|---|---|
| | found:C | 62.66 | H 4.62 | N 32.82 % |

Molecular weight: 172.19; $C_9H_8N_4$.

A mixture of 8.6 g. of 1-(2-cyanoethyl)-benztriazole, 60 ml. of 96 percent ethanol , 60 ml. of water, 7.0 g. of hydroxylamine-hydrochloride and 4.8 g. of sodium carbonate is refluxed for 12 hours. The reaction mixture is evaporated in vacuo, whereupon 100 ml. of water are added to the residue. An oily substance is separated which becomes soon crystalline. The crude product is filtered and recrystallized from 96 percent ethanol. Thus 7.2 g. of 3-(benztriazolyl-1)-propionyl-amidoxime are obtained. M.p.: 165° C.

| Analysis: | calc.: | C 52.67 | H 5.40 | N 34.13 % |
|---|---|---|---|---|
| | found: | C 53.06 | H 5.66 | N 34.48% |

Molecular weight: 205.22; $C_9H_{11}N_5O$.

EXAMPLE 5

24.0 g. of 7-(2-cyanoethyl)-theophylline are dissolved in 260 ml. of hot 96 percent ethanol, whereupon a solution of hydroxylamine base (set free from 14.17 g. of hydroxylamine-hydrochloride with 17.23 g. of sodium-hydrogen-carbonate in 40 ml. water as medium) is added to the hot solution. The reaction mixture is refluxed for 8 hours, whereupon the solvent is evaporated in vacuo and 200 ml. of water are added to the residue. The crystalline crude product is filtered and recrystallized from hot water. Thus 21.70 g. of 3-(theophylline-7-yl)-propionyl-amidoxime are obtained. M.p.: 213°–214° C.

| Analysis: | calc.: | C 45.11 | H 5.30 | N 31.56 |
|---|---|---|---|---|
| | found: | C 45.21 | H 5.50 | N 31.30 |

Molecular weight: 266.26; $C_{10}H_{14}N_6O_3$.

EXAMPLE 6

11.5 g. of 1-cyanomethyl-6,7-dimethoxy-3,4-dihydro-isoquinoline are dissolved in 280 ml. of hot 96 percent ethanol, whereupon a solution of hydroxylamine base (set free from 6.95 g. of hydroxyl-amine-hydrochloride with 10.18 g. of sodium-hydrogen-carbonate in 20 ml. water as medium) is added to the warm solution. The reaction mixture is refluxed on a water-bath for 22 hours, whereupon it is evaporated to dryness in vacuo. The residue is suspended in 50 ml. of water whereafter the crystalline substance is filtered and dried. The crude product is recrystallized from 30 percent by volume ethanol. Thus 9.4 g. of (6,7-dimethoxy-3,4-dihydro-isoquinolinyl-1)-acetamidoxime-monohydrate are obtained. M.p.: 134°–136° C.

Analysis:
calc.:      O 55.50   H 6.81   N 14.94 %
found:      O 55.97   H 6.91   N 15.42 %

Molecular weight: 281.31; $O_{13}H_{19}N_3O_4$ a. The toxicity of the product amounts to $LD_{50}$ = 1,600 (1,200–2,130) mg./kg. when administered perorally.

b. The product exhibits a pronounced antiphlogistical effect. The antiinflammatory effect of the product was tested on rat paw oedemas. The results obtained by using various inflammation-causing agents are summarized in the following table 1.

TABLE I

Demonstration of anti-phlogistic effect

| Inflammatory agent | $ED_{min}$ (p.o. suspension). |
|---|---|
| China clay | 75 mg./kg. |
| Yeast | 100 mg./kg. |
| Serotonine | 100 mg./kg. |
| Dextrane | 50 mg./kg. |

Inflammation is induced by subjecting the dehaired skin of guinea pigs to ultraviolet irradiation for a period of 40 seconds. The product alone does not exhibit antiphologistic effect. On administrating together 50 mg./kg. of Amidazophen (1-phenyl-2,3-dimethyl-4-dimethylamino-pyrazolone-5) and 100 mg./kg. of the product a 100 percent antiphlogistic effect is achieved. (The 50 mg./kg. dose of Amidazophen exerts in itself a 50 percent effect.) Thus the product potentiates the effect of Amidazophen.

c. The product exhibits a temperature-decreasing effect. The product decreases the normal temperature of rats when administered orally in a dose of 50 mg./kg. This effect is four time stronger than that of Amidazophen. If administered in a 100 mg./kg. oral dose in rats, it lowers the fever induced by yeast injection. The effect of the product on central nervous system and the spasmolytic, analgetic and sedative effect thereof were also tested. The product proved to be ineffective in these tests. It possesses however weak antihistamine acitivity.

EXAMPLE 7

3.6 g. of 1-cyanomethyl-6,7-diethoxy-3,4-dihydro-isoquinoline are dissolved in 60 ml. of hot 96 percent ethanol, whereupon a solution of hydroxylamine base (set free from 1.95 g. of hydroxylamine-hydrochloride with 2.36 g. of sodium-hydrogen-carbonate in 10 ml. water as medium) is added. The reaction mixture is refluxed on a water-bath for 22 hours, whereupon it is evaporated to dryness. The residue is suspended in 30 ml. of water. The crystalline substance is filtered and dried. The crude product is recrystallized from 60 percent by volume ethanol. Thus 3.10 g. of (6,7-diethoxy-3,4-dihydro-isoquinolinyl-1)-acetamidoxime are obtained. M.p.: 170°–172° C. Analysis: N % = 14.67 (calc.: 14.37). Molecular weight: 292.35; $C_{15}H_{22}N_3O_3$.

EXAMPLE 8

12.9 g. of N-(2-cyanoethyl)-6,7-dimethoxy-3,4-dihydroisocarbostyryl are dissolved in 75 ml. of hot ethanol, whereupon 20 ml. of an aqueous solution of hydroxylamine base (set free from 6.95 g. of hydroxylamine-hydrochloride as shown in the preceding examples) is added. The reaction mixture is refluxed for 22 hours, whereupon it is allowed to stand in a refrigerator. The precipitated crystalline substance is filtered, washed with water and dried. The crude product is recrystallized from ethanol. Thus 5.7 g. of 3-(6,7-dimethoxy-3,4-dihydro-isocarbostyryl-2-yl)-propionyl-amidoxime are obtained. M.p.: 188° C.

Analysis:   calc.:   C 57.98   H 6.59 tg N 14.48 %
            found:   C 57.60   H 6.85    N 14.58 %

Molecular weight: 288.27; $C_{14}H_{17}N_3O_4$

EXAMPLE 9

29.23 g. 2-hydroxy-quinoxaline are admixed with 0.6 g. of phthalimide-potassium whereupon 130 ml. of acrylonitrile are added and the reaction-mixture is boiled for 7 hours. Thus 37.0 g. of 1(1H)-(2-cyano-ethyl)-quinoxalinone-2 are obtained. After recrystallization from butanol the product melts at 207°–208° C.

Analysis: N% = 21.07 (calc.: 21.09)

Molecular weight 199.20; $C_{11}H_9N_3O$.

To a suspension of 30.60 g. of 1(1H)-(2-cyano-ethyl)-quinoxalinone-2 and 150 ml. of 96 percent ethanol a solution of hydroxylamine base (set free from 21.4 g. of hydroxylamine hydrochloride with 25.8 g. of sodium-hydrogen carbonate in 50 ml. water as medium) is added and the reaction mixture is boiled for 16 hours. At the beginning of the heating a clear solution is formed. On cooling 30.0 g. of 3-1(1H)-quinoxalinone-2-yl)-propionyl-amidoxime precipitates.

M.p.: 180°–182° C.

Analysis: N% = 24.06 (calc.: 24.13).

Molecular weight: 232.24; $C_{11}H_{12}N_4O_2$.

EXAMPLE 10

24.0 g. of 2-methyl-3H-quinazolone-4 are reacted with 100 ml. of acrylonitrile in the presence of 0.4 g. of phthalimide-potassium as described in the preceding examples. Thus 25.98 g. of 2-methyl-3-(3H)-(2-cyano-ethyl)-quinazolone-4are obtained. M.p.: 152°–153° C. The product may be recrystallized from 96 percent ethanol.

Analysis: N % = 19.97 (calc.: 19.71 ).

Molecular weight: 213.23; $C_{12}H_{11}N_3O$.

23.45 g. of 2-methyl-3-(3H)-(2-cyano-ethyl)-quinazolone-4 and a solution of hydroxylamine base (set free from 15.30 g. of hydroxylamine-hydrochloride and 18.48 g. of sodium-hydrogen carbonate in 25 ml. of water) are boiled in 70 ml. of 96 percent ethanol for 15 hours. The reaction is characterized by quick precipitate-formation. Thus 26.70 g. of 3-2-methyl-3 H-quinazolone-4-yl-(3)-propionyl-amidoxime are obtained.

M.p.: 227°–228° C. The product may be crystallized from a large amount of dimethyl-formamide. The product is excellently soluble in aqueous solution of mineral acid.

Analysis: N% = 22.40 (calc.: 22.76).

Molecular weight: 246.26; $C_{12}H_{14}N_4O_2$.

EXAMPLE 11

108.6 g. of 3-phenyl-3-cyano-pyroracemic acid ethyl-ester and 55.0 g. of o-phenylene-diamine are boiled in 300 ml. of glacial acetic acid for 10 minutes. Thus 108.0 g. of 2-hydroxy-3-α-cyano-benzil-quinoxaline are obtained. After recrystallization from butanol the product sinters at 216° C. and melts at 226° C.

Analysis:   calc.:   C 73.55   H 4.25   N 16.08 %
            found:   C 73.48   H 4.61   N 16.01 %

Molecular weight: 261.27; $C_{16}H_{11}N_3O$.

2.75 g. of 2-hydroxy-3-α-cyano-benzyl-quinoxaline are admixed with a solution of hydroxyl-amine base (set free from 1.39 g. of hydroxylamine-hydrochloride with 1.70 g. of sodium-hydrogen carbonate in 10 ml. of water as medium) in 25 ml. of 96 percent ethanol, under boiling. The reaction mixture is refluxed for 14 hours. During the whole reaction period a precipitate is present in the reaction mixture. Thus 2.20 g. of 3-hydroxy-2-quinoxalinyl-phenyl-acetamidoxime are obtained which melts at 231° C. (after crystallization from a mixture of dimethylformamide and water).

Analysis: calc.: C 65.29  H 4.79  N 19.04%
found: C 65.20  H 5.20  N 19.15%

Molecular weight: 294,30; $C_{16}H_{14}N_4O_2$.

The pharmacological activity of the products according to the present invention has been tested according to the following methods:

1. Toxicity

The products have been administered orally to mice. 1 percent suspensions of the product formed with methyl-cellulose are prepared and administered to the animals in doses of 0.2 ml. pro 10 g. The mortality has been determined after 48 hours. The $LD_{50}$ value has been calculated by the method of Litchfield-Wilcoxon (J.Pharmacol. 1949.96 99).

2. Antiphlogistic effect

Phlogistic paw-oedemas are induced in rats starved for 24 hours by subplantar injection of 0.1 ml. doses of 5 percent of china clay, 1 percent of dextran, 0.025 percent of serotonine and 5 percent of brewers yeast. The diameter of the paws of the animals is measured with a two-armed reader before the inducing of the oedemas (basic value) and later at different intervals after the administration of the antiphlogistic agent. The test compound is administered orally in form of 1 percent suspensions formed with methyl-cellulose 1 hour before the inducing of the oedemas.

The antiphlogistic effect is determined by measuring the paw-oedema of the untreated and treated animals and subtracting the value of the treated animals from that of the control. The rate of inhibition is expressed in percentages. All values have been determined on groups consisting of 10 animals each.

3. Temperature reducing effect a. The rectum temperature of rats is measured with a mercury therometer. The temperature of untreated animals serves as control. After administration of the test compound the temperature of the animals is measured every hour for 5 hours. The values were determined on groups consisting of 10–10 animals each.

b. The antipyretic effect has been determined as follows: Fever is induced in rats by s.c. administration of 1 ml. of 20 percent brewer's yeast. Fever develops after 16 hours and remains at a high value. The antipyretic effect is determined in said animals by measuring the rectum temperature.

Analgetic effect

This test has been carried out in mice according to the method of Pórszász-Herr (Kisérletes Orvostudomany 1950.2.292). Mice are placed on 53° C. warm metal plates. The period of time after which the animal licks one of its paws is considered as "pain-reaction." Said pain-reaction is determined in untreated condition and 1 and 2 hours after treatment. All tests are carried out on groups consisting of 20 animals each. The analgetic effect may be seen from the pronounced lengthening of the pain-reaction interval.

The results of the above tests are summarized in the following table:

| Example No. | Toxicity X | Rat paw china-clay oedema | Temperature Normal | Temperature Feverish | Analgetic effect |
|---|---|---|---|---|---|
| 1 | 300/217–414 | 50 | | | [1] 100 |
| 2 | 2,000/1,540–260 | 100 | | 100 | |
| 3 | | 1,500 | 100 | 200 | |
| 4 | | 1,000 | 100 | | |
| 5 | | | | | |
| 6 | 1,600/1,200–2,130 | 75 | 150 | 100 | |
| 7 | 360/310–418 | 50 | [1] 100 | | |
| 8 | | 1,000 | 100 | | |
| 9 | 820/509–1,270 | | 100 | 100 | |
| 10 | | 1,000 | 100 | | 200 |
| 11 | | 1,000 | | | |

[1] Toxical.

The doses disclosed in the table (mg./kg.) relate to the smallest effective dose ($ED_{min}$).
— ineffective
X Toxicity, for orientation.

What we claim is:
1. As an antiphlogistical pharmaceutical (6,7-dimethoxy-3,4-dihydro-isoquinoline-1)-acetamidoxime.

* * * * *